United States Patent Office 3,371,159
Patented Feb. 27, 1968

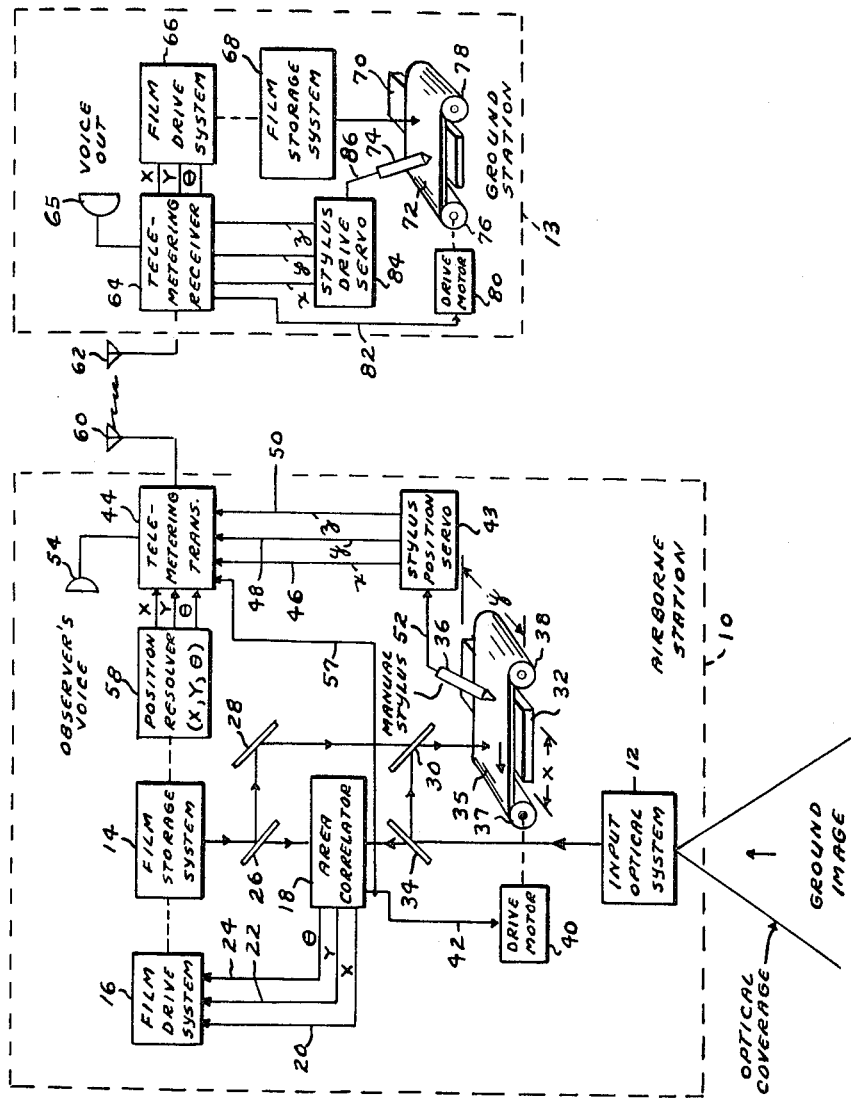

3,371,159
RECONNAISSANCE SYSTEM WITH GROUND DISPLAY OF AIRBORNE PICTORIAL INFORMATION
Paul B. Oncley, Seattle, Wash., assignor to the United States of America as represented by the Secretary of the Air Force
Filed May 18, 1965, Ser. No. 457,544
1 Claim. (Cl. 178—6.6)

ABSTRACT OF THE DISCLOSURE

Identical film strip maps, conforming to the ground track to which a vehicle is committed, are prepared in advance of a reconnaissance flight of an airborne vehicle. One of the films is located aboard an airborne vehicle and the other is located at the ground station. The image on the film in the airborne vehicle is continuously compared with the real time image below the vehicle during flight with an area correlator which provides $x$, $y$ and $\theta$ signals to continuously position the film image with respect to the ground image. The film position signals are continuously transmitted to the ground station to maintain the ground film in position synchronism with the airborne film. The film image and ground image are projected onto a screen having a moving overlay. The ground station film image is likewise projected onto a screen having a moving overlay. A stylus is used to make various markings on the overlay to provide additional information that the airborne observer wishes to transmit to the ground. A like stylus is moved with respect to the ground station overlay in response to positioning information transmitted to the ground station. A voice communication system is also provided to transmit additional related information to the ground station.

---

This invention relates to a real-time reconnaissance system and, particularly, to a system for coordinating a photographic image of a ground area with the real-time ground image of the same area and marking activities of probable significance on an image overlay which is viewed by the airborne observer.

In conventional aerial reconnaissance systems, it is well known that information concerning the disposition of military units, the results of bombardment, the deployment of forces and the like is of maximum value when immediately placed at the disposal of the commanding organization. Reconnaissance techniques are known in which surveillance results are determined by (1) post-flight evaluation of in-flight photographs and data, or (2) interpretation of broad-band transmission once the position of the survey craft coincides with line-of-sight transmission to satisfactory ground bases. Both of these techniques introduce an undesirable delay and, by requiring mission completion before any data is made available, reduce the reliability and usefulness of the information obtained. Thus, with the increasing tempo of military operations, reconnaissance knowledge becomes extremely perishable and ordinarily has less value when its transmission is delayed.

Accordingly, one object of this invention is to provide an improved aerial reconnaissance system.

Another object of this invention is the provision of a reconnaissance system in which only that photo-map information not already in the possession of the command organization is transmitted to the ground station.

A further object of the invention is to provide a reconnaissance system including a direct air-to-ground link in which the work of the airborne controller in monitoring the surveillance apparatus is held to a minimum and requires merely a normal writing effort.

Still another object of this invention is the provision of a reconnaissance system by aerial methods which combines two synchronized images of substantially the same scene, the one occurring in real time and the other being the result of a previous reconnaissance effort, for permitting the airborne observer viewing the composite image to mark, on an overlay provided for his use, pertinent differences of reconnaissance value which then automatically are duplicated at the ground station on a similar demonstration placed at the disposal of the ground personnel.

Yet another object of the invention is to provide real time pictorial data transmission of an area of interest in a manner obliging to human habits, thereby freeing the airborne observer to divide his attention between other equally important tasks.

In accordance with the invention, identical motion-picture film strip maps, conforming to the ground track to which the reconnaissance vehicle is committed, are prepared in advance from earlier reconnaissance missions or from other cartographic sources. Aboard the airborne vehicle is a viewing screen which can be seen by the observer. Another screen is located at the ground station for use by the personnel monitoring the flight. Pictures of the related ground track are projected simultaneously onto both viewing screens. In the airborne vehicle, an optical image taken from a field of view directly below the vehicle, and thus showing the surface of the earth, simultaneously is optically superimposed onto the screen monitored by the airborne observer. A motor-driven transparent writing surface is placed over the screen on which the film strip and ground images are being displayed, so that the observer may inscribe marks, notes, addenda, and text of any sort for recording items of reconnaissance value. Reconnaissance coverage therefore is obtained which approaches eye-witness quality. A writing surface covers the screen at the ground surface and hence serves the same purpose. Sensors convert the positions of the stylus used by the airborne observer into rectangular coordinate signals which are transmitted to the ground station. A slaved stylus at the ground station is guided to duplicate automatically the marks made by the observer. A voice radio link between the airborne and the ground station may optionally be provided.

In order to match the film strip to the terrain under scrutiny, an optical area correlator carried aboard the airborne vehicle continuously compares the film strip and the ground image and causes the film speed to be either retarded or advanced until the film strip image is moving synchronously with the real-time image which appears in the field of the optical viewing system. Once synchronized, the film displayed to the airborne observer conforms substantially exactly to the position of the aircraft relative to the ground track. Through the use of synchronizing signals transmitted to the ground station, the film which the ground personnel see is kept essentially identical to what the airborne observer sees. Other synchronizing signals provided by the area correlator lock the speeds of the two overlays to the frame speeds of the projectors.

Used in conjunction with the voice report, the invention provides an improved means of transmitting the real-time location and characteristics of reconnaissance data with strong emphasis on the timeliness of its delivery.

A complete understanding of the invention and an introduction to other objects and features not specifically mentioned may be had from the following detailed description of one embodiment thereof when read in connection with the single appended drawing constructed in accordance with the invention.

Referring now to the drawing, an airborne station 10, carried aloft in an air vehicle passing over an operating zone assigned for reconnoitering purposes, comprises an input optical system 12 whose field of view admits an optical image that corresponds to the external arrangement found along the established track. Reconnaissance information is processed at a remote ground-based station 13. Examples of valuable surveillance information may include the present order of battle, the positions of mobile weapons, or the results of military bombing operations. A film storage system 14 containing a film strip of the assigned track, and being controlled by a film drive system 16, projects a photographic image onto an area correlator 18 of known type. It will be assumed that from earlier flights of reconnaissance satellites or from other cartographic sources, a photo-map matrix will be prepared of all areas for which reconnaissance sorties are intended. Prior to the manned mission involving the aforesaid air vehicle, sections of the photo-map matrix will have been reduced to a set of strip maps applicable for in-flight display. In the illustrated arrangement, it will be understood that the strip maps will be placed in film storage system 14 according to the course expected to be followed by the pilot during the area coverage, so that the map which corresponds to what the observer sees below him is displayed during the reconnaissance run.

The image from input optical system 12 is conducted to area correlator 18 which in turn produces three output signals X, Y and θ conducted over lines 20, 22 and 24, respectively, to film drive system 16. The output signals on lines 20 and 22 are functions of the rectangular coordinates of the map positions emerging from film storage system 14. The third output signal θ, which appears on line 24, is a function of the orientation of the same map image relative to the angular bearing of the air vehicle taken in the yaw plane.

A partially reflecting mirror 26 is provided between film storage system 14 and area correlator 18, and other partially reflecting mirrors 28 and 30 are so positioned that the image incident thereon from reflector 26 is reflected onto a viewing screen 32. Elemental areas of screen 32 are defined by x and y rectangular coordinates, as shown. In a similar manner, a partially reflecting mirror 34 is disposed between input optical system 12 and area correlator 18, and is arranged so that, on screen 32, the ground image and the photographic map image are optically superimposed. The picture displayed on screen 32 thus represents both the map facsimile projected by film storage system 14 and the optical image scanned by input optical system 12. It is obvious that the overlay relationship of the two images, as recorded on screen 32, preferably is in a corresponding scale.

When thus applied to film drive system 16, the output signals of area correlator 18 synchronously relate the film displayed by film storage system 14 to the real-time optical image perceived by the observer. Thus, as the film strip from film storage system 14 is reproduced, the picture seen on screen 32 will continuously change such that, during the reconnaissance runs, synchronism between the filmed map and the visual ground image will at all times be maintained.

A transparent material 35 offering a firm surface on which the airborne observer or controller may write, as by means of a stylus or pencil 36, for example, is arranged between mirror 30 and screen 32 in overlying relationship with the screen. Numerous inscribable clear plastic materials are readily suggested to serve as material 35. Transport rollers 37 and 38 are driven by a drive motor 40 having a connection with roller 37. At the time of the previously-discussed image synchronization by area correlator 18, a primary speed control signal is produced on line 42 whereby motor 40 is controlled to transport the transparency 35 past screen 32 in synchronism with the images unfolding on the screen.

In the illustrated arrangement, a position servo 43 produces three input signals $x$, $y$ and $z$ conducted to a telemetering transmitter 44 by means of lines 46, 48 and 50. The single line 52 represents all of the various connections between stylus 36 and position servo 43 including conductors to the pick-up head of the stylus. The first two signals $x$ and $y$ are functions of the rectangular coordinates screen 32 by which the tip of stylus 36 may be located relative to the image projected on the screen. The third signal $z$ is produced upon contact between the tip of stylus 36 and transparency 35, in a manner well known in the art. This form of stylus position indication and start-stop control described herein is of known type and is common in facsimile transmission systems.

Voice communication between the airborne observer and the ground station is provided by means of a microphone 54, the audio signals of which are applied to transmitter 44 are supplied to the voice out microphone 65 at the receiver. The motor-speed synchronizing signal from area-correlator 18 is also applied to transmitter 44 by means of line 57.

In order to synchronize the airborne and ground displays, the signals from area correlator 18 provided on lines 20, 22 and 24 are transferred to transmitter 44 by means of a position resolver 58 mechanically coupled to film storage system 14. The three film synchronizing signals indicate the position of the film strip available to the airborne observer so that what is seen at the ground station, once signals X, Y and θ are transmitted, is the same as that displayed aboard the air vehicle.

In addition to the speech signals and the motor-speed synchronizing signal on line 57, transmitter 44 transmits, via antenna 60, modulation intelligence as to (a) Map position—X direction
(b) Map position—Y direction
(c) Map orientation—angular bearing, yaw plane (θ)
(d) Stylus position—$x$ direction
(e) Stylus position—$y$ direction
(f) Stylus mark—$z$ (off/on).

The transmitted wave is detected by antenna 62 at ground station 13 and is demodulated in telemetering receiver 64 which reproduces the six output signals relating to the film and stylus information, and the voice information and motor-speed synchronizing signal. The signals X, Y and θ are fed to a film drive system 66 having the proper characteristics to position a film storage system 68 to display a strip film identical in content with the strip film projected at airborne station 10. The scene viewed by the ground observer on viewing screen 70 is therefore substantially a duplication of the film image that is seen by the airborne observer. It therefore will be understood that film drive system 66 and film storage 68 operate in a manner similar to that already described hereinabove in connection with corresponding elements 16 and 14, respectively, found aboard airborne station 10 and, in effect, are slaved by signals X, Y and θ.

A transparent material 72, similar to the inscribable overlay 35 which has been previously referred to, bears data written by a stylus 74 and is arranged between film storage system 68 and screen 70 to overlay the screen. Transport rollers 76 and 78 are driven by a drive motor 80 having a connection with rollers 76, and receiving a secondary speed control signal from receiver 64 conducted by line 82. Motor 80 therefore is controlled to move transparency 72 relative to screen 70 in synchronism with the film projected on screen 70.

The stylus drive signals $x'$, $y'$ and $z'$ are conducted from receiver 64 to a stylus drive servo 84 which automatically controls the operation of stylus 74. The single line 86 represents all of the various connections between servo 84 and stylus 74 including conductors by which the on-off writing function and the x–y coordinate movement of stylus 74 are performed.

In operation, as the air vehicle moves, each picture projected onto screen 32 from film storage system 14 will record the position of the various ground areas of the assigned reconnaissance track at the moment of exposure of the ground image through input optical system 12. The area correlator 18 has the function of map-matching the film and ground images recorded thereon. None of the system components of the area correlator have been shown in detail since numerous techniques in well-developed states are known for performing this function. With area correlation achieved, when these same two images are viewed by the airborne observer, the two images will essentially merge into one another and any differences of reconnaissance interest which exist between the composite images will be reported by the airborne observer simply by writing with the stylus pertinent notes, figures, indicia and the like on transparency 35. As soon as the projection movements of the ground station systems 66 and 68 have been synchronised by signals X, Y and θ, the position of stylus 36 will be communicated to stylus 74 where the stylus, under the control of servo 84, will automatically trace an identical pattern of the reported activities on transparency 72. In addition to providing the ground station with a running visual commentary of the events or activities which the observer sees, the observer may interpret his writings through voice communication with the ground personnel. Thus, a very natural disclosure of items of possible interest is presented.

From a brief summary of the foregoing description of the invention, it is evident that remote observers back at the ground station are fed a continuous stream of information which, in the name of timely reconnaissance, far surpasses those methods heretofore used which require either film development or completion of the mission before the results can be adequately interpreted. Furthermore, by returning the information in real time only that information which is not already known to the command center is transmitted to the ground station. Redundant film processing efforts mainly caused by the presence of routine features of the zone of absolutely no value to the reviewing authorities is thus avoided.

Although only one embodiment of the invention has been illustrated and described, it will be apparent to those skilled in the art that various changes and modifications may be made therein without departing from the spirit of the invention or the scope of the appended claim.

I claim:

1. An aerial reconnaissance system for enabling reconnaissance entries made by an airborne observer to be reproduced automatically at a ground station under conditions of real time, wherein a continuous pictorial record of said entries is made available to ground personnel, said system comprising:
   first and second display screens disposed aboard the reconnaissance aircraft and at said ground location, respectively, and each having an image-receiving surface,
   first and second movable inscribable transparent data records disposed to overlay said first and second screens, respectively, for permitting said observer to record on said first data record pertinent reconnaissance activities of probable importance,
   said first and second data records being inscribed with first and second marker means, respectively, adapted to be moved into writing engagement with said data records,
   first and second photographic motion-picture display means located aboard said aircraft and at said ground station, respectively, for simultaneously projecting on said screens a film image of a given reconnaissance zone, said films being prepared prior to said reconnaissance mission so that, at said aircraft and ground locations, for each optical image of said zone as seen from said aircraft a corresponding cartographic image exists on said film,
   input optical system means aboard said aircraft for projecting a continuous map-like optical image of said zone onto said first screen such to produce an overlay of said film images and said optical images,
   area correlating means aboard said aircraft exposed to said film and optical images for continuously controlling, throughout the reconnaissance period, said first motion-picture display means to optically superimpose on said first screen that film image which corresponds to the instantaneous optical image admitted by said input optical system means,
   said area correlating means producing a primary speed-control signal when said film image and optical image correspondence is achieved,
   motive means controlled by said speed-control signal for synchronously moving said first data record relative to said first screen in accordance with the real-time speed of said optical image,
   position resolver means operable by said first motion-picture display means for converting the image-correlation information produced by said area correlator means to a first group of electrical signals,
   sensor means driven by said first marker means for converting inscriptions made by said observer on said first data record to a second group of electrical signals characterizing the movements of said first marker means,
   a telemetering transmitter adapted to be mounted on said aircraft and having inputs receiving said first and second groups of electrical signals and said speed-control signal,
   a telemetering receiver system located at said ground location for producing third and fourth groups of electrical signals that are functions of said first and second groups of electrical signals, respectively, and a secondary speed control signal as a function of said primary speed control signal,
   drive means controlled by said secondary speed control signal for synchronously moving said second data record relative to said second screen,
   said third group of signals operating said second motion-picture display means to illuminate said second screen synchronously in accordance with the film presentation on said first screen,
   and servo control means controlled by said fourth group of signals and operatively connected to said second marker means for automatically producing inscriptions on said second data record in accordance with the observer-made movements of said first marker means, whereby observers at said ground location are given a real-time indication of said reconnaissance entries.

References Cited

UNITED STATES PATENTS

| 2,986,601 | 5/1961 | Mero | 178—18 |
| 2,989,890 | 6/1961 | Dressler | 343—5 |
| 3,005,044 | 10/1961 | Golay | 178—6.6 |
| 3,163,098 | 12/1964 | Kierstead | 343—5 |

ROBERT L. GRIFFIN, *Primary Examiner.*

RODNEY D. BENNETT, *Examiner.*

C. E. WANDS, H. W. BRITTON, *Assistant Examiners.*